United States Patent
Bernas et al.

(10) Patent No.: US 6,989,119 B2
(45) Date of Patent: Jan. 24, 2006

(54) HONEYCOMB EXTRUSION DIES

(75) Inventors: James J. Bernas, Horseheads, NY (US); David W. Folmar, Campbell, NY (US); Kenneth C. Sariego, Beaver Dams, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/410,321

(22) Filed: Apr. 9, 2003

(65) Prior Publication Data

US 2004/0150133 A1   Aug. 5, 2004

Related U.S. Application Data

(60) Provisional application No. 60/444,651, filed on Feb. 3, 2003.

(51) Int. Cl.
   *B29C 47/12*   (2006.01)
(52) U.S. Cl. .................. 264/177.12; 425/380; 425/467
(58) Field of Classification Search ................ 425/380, 425/461, 467; 264/177.12
   See application file for complete search history.

(56) References Cited

U.S. PATENT DOCUMENTS

| | | | |
|---|---|---|---|
| 3,790,654 A | 2/1974 | Bagley | 264/177.11 |
| 3,905,743 A | 9/1975 | Bagley | 425/464 |
| 4,118,456 A * | 10/1978 | Blanding et al. | 264/177.12 |
| 4,354,820 A | 10/1982 | Yamamoto et al. | 425/461 |
| 4,731,010 A * | 3/1988 | Cunningham | 425/461 |
| 4,902,216 A | 2/1990 | Cunningham et al. | 425/463 |
| 5,066,215 A | 11/1991 | Peters et al. | 425/464 |
| 5,702,659 A | 12/1997 | Kragle et al. | 264/177.11 |
| 6,413,072 B1 * | 7/2002 | Brew et al. | 425/198 |
| 6,558,151 B1 * | 5/2003 | Kragle | 425/463 |

* cited by examiner

*Primary Examiner*—Joseph S. Del Sole

(74) *Attorney, Agent, or Firm*—Kees van der Sterre

(57) ABSTRACT

Extruded honeycomb products are formed by means of an extrusion die incorporating a pin support section positioned between the die body and the pin array forming the die discharge slots, the pin support providing enlarged support segments that improve pin stability and die resistance to pin damage without overly restricting batch flow through the die.

4 Claims, 2 Drawing Sheets

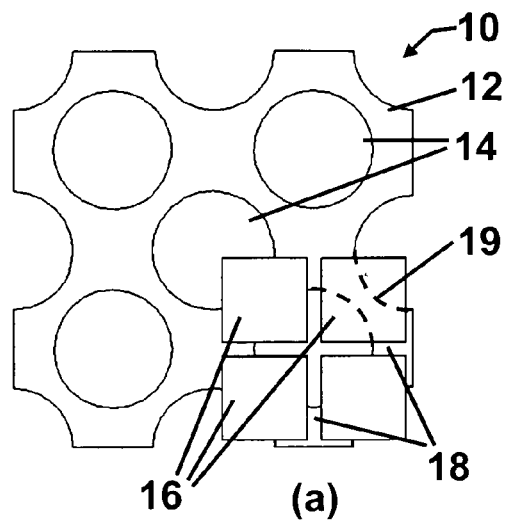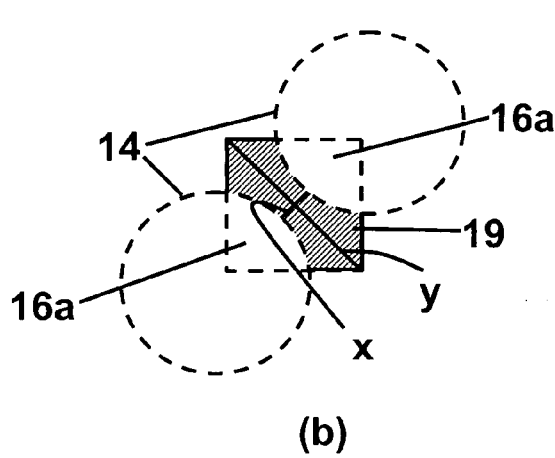
Fig. 1a  Fig. 1b
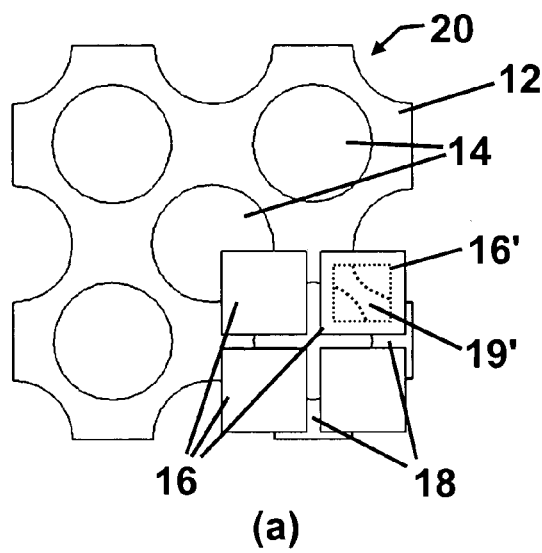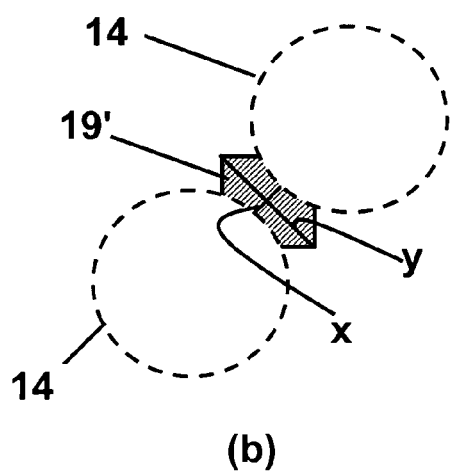
Fig. 2a  Fig. 2b

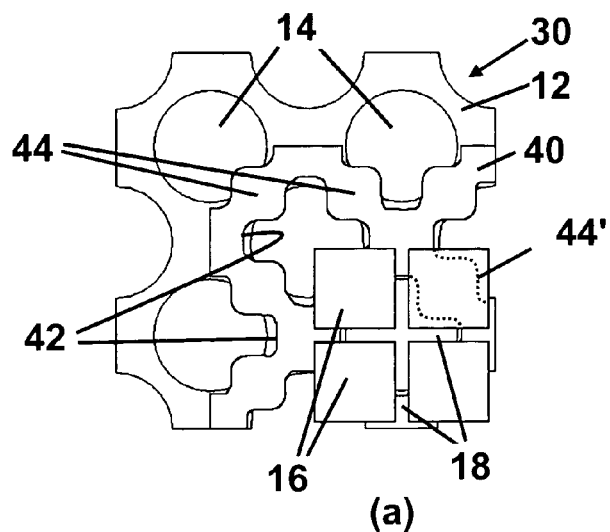
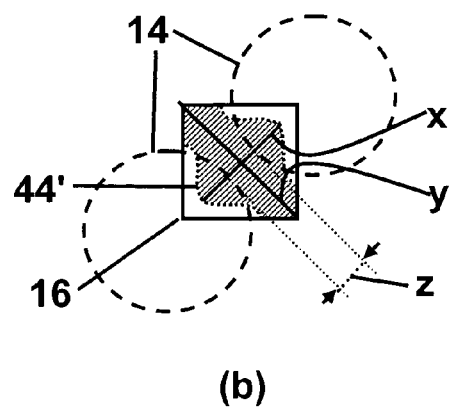
Fig. 3a　　　　　　　　　　Fig. 3b
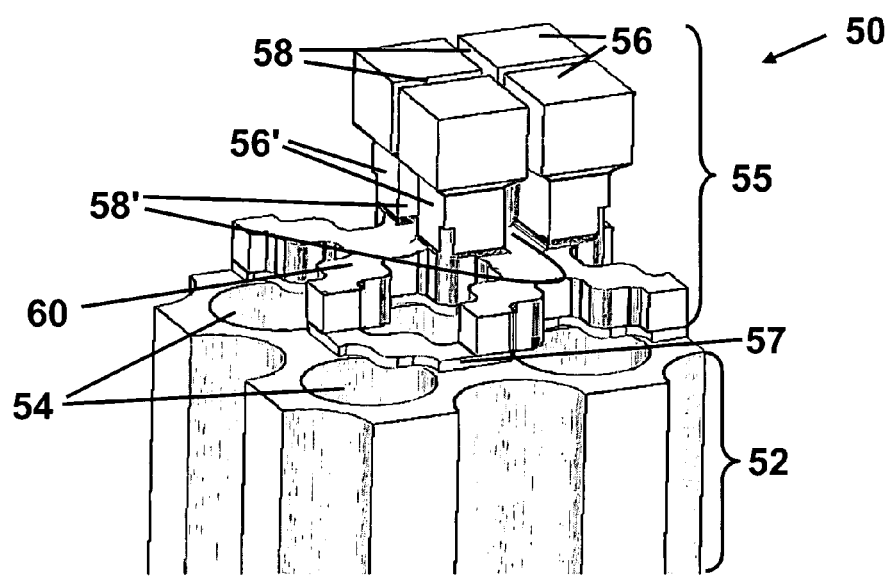
Fig. 4

HONEYCOMB EXTRUSION DIES

This application claims the benefit of U.S. Provisional Application No. 60/444,651, filed Feb. 3, 2003, entitled "Honeycomb Extrusion Dies", by Bernas et al.

BACKGROUND OF THE INVENTION

The present invention relates to honeycomb extrusion dies and more particularly to an improved extrusion die design offering improved mechanical durability.

The use of extrusion dies to form thin-walled honeycomb structures is well known. U.S. Pat. Nos. 3,790,654 and 3,905,743 to Bagley describe a basic design for such a die, that design incorporating a plurality of feedholes entering an inlet face of the die and extending through the body of the die to convey extrudable material to a discharge section formed on the die outlet surface by a criss-crossing array of interconnecting discharge slots. The discharge slots, which can be viewed as being formed by the gaps in a spaced array of parallel pins connecting with the die body, reform the extrudable material into an interconnecting wall structure for a channeled honeycomb body as that material is discharged from the discharge face of the die.

As the uses for such honeycomb structures have increased, so also has the need for extrusion dies capable of forming more finely structured honeycombs. A fundamental limitation of these dies, however, is the fact that neither the feedholes nor the discharge slots may be multiplied or reduced in size without limit, since the extrusion pressures used for plasticized powder extrusion require substantial stiffness or toughness in the die body and in the pin array to avoid die distortion or breakage.

Feedhole redesign is one area used in the past to achieve reductions in the required extrusion forces. U.S. Pat. Nos. 5,066,215 and 5,702,659 provide examples of such approaches, but both of these solutions involve impracticably high die fabrication costs and increased die fabrication complexity.

Another problem to be addressed at finer slot sizes is that of lateral batch flow redistribution. In the operation of these dies, longitudinal batch flow from the die body feedholes must rapidly transition to a combination of lateral and longitudinal flow within the die discharge section in order to adequately fill the discharge slot array. If the discharge slots are so narrow that lateral flow is non-uniform, defects such as marginal cell wall knitting, wavy or swollen cell walls, missing cell walls, and plugged cells will appear in the extruded product.

Approaches to improve the lateral redistribution of flowing honeycomb batch material within these dies have involved techniques such as the machining of lateral conduit channels behind the die discharge face. With similar results, pin arrays of smaller pin diameter have been used in combination with pin caps to provide both a fine discharge slot array and an opening of the spaces behind the discharge face where lateral batch redistribution can more readily occur.

U.S. Pat. Nos. 4,354,820 and 4,902,216 illustrate examples of die designs employing features of this type. In both of these cases, however, the reductions in pin cross-section incurred in the course of implementing these designs result in dies that are highly susceptible to damage via pin bending or pin detachment from impact or fatigue. Pin damage is not economically repairable with current technology.

The development of improved extrusion dies is somewhat impeded by the fact that all current economic methods for fabricating extrusion dies involve traditional rotating or straight line tooling. State-of-the-art techniques such as electrochemical machining and wire-electrical discharge machining are viewed as largely incapable of providing complex batch redistribution chambers or contours within the interiors of these dies.

What is therefore needed is an improved honeycomb extrusion die and a method of making it that are both effective and economic in practice. The die fabrication process should not involve complex machining and/or assembly processes, and the dies produced should be sufficiently robust to resist damage in an industrial environment for the continuous production of finely structured honeycomb products.

SUMMARY OF THE INVENTION

The present invention provides honeycomb extrusion dies that provide improved batch flow characteristics in a highly durable design. The design improves pin stiffness via pin root strengthening at the die body-pin interface, while still providing expanded lateral redistribution spaces within the die that promote smooth, uninterrupted batch flow. Thus these dies support the continuous and consistent extrusion of finely structured honeycomb products at reduced extrusion pressures and low defect rates.

In a first aspect, therefore, the invention includes a honeycomb extrusion die comprising a die body incorporating an array of parallel feedholes and a discharge section connecting with the die body comprising an array of criss-crossing discharge slots communicating with the feedholes. The feedholes and discharge slots may be of conventional dimensions, but are preferably configured for the production of so-called thin-walled honeycomb structures, i.e., structures having cell or channel walls not exceeding about 100 um in thickness defining the channels of the honeycomb body.

The discharge slots of the die are conventionally formed by the spaces in an array of adjoining parallel pins which connect to the die at their pin root ends. The surfaces of the outer ends of the pins form the discharge face of the die. The feedholes in the die body are separated by a minimum feedhole inter-spacing which depends largely on the cell or channel density of the honeycombs to be produced by the discharge slot array. These are cell densities generally greater than 60 cells/cm$^2$ of honeycomb cross-section and more typically greater than 140 cells/cm$^2$.

An important further feature of the extrusion die that imparts significantly improved pin durability thereto is a pin support section disposed between and connecting with both the die body and the pin root ends. The pin support section comprises a planar die region, extending between the die body and pins in an alignment parallel with the die discharge face, that is configured to add support material at the pin root ends without significantly obstructing the flow of batch from the feedholes into the die discharge section.

Briefly, the pin support section comprises both an array of apertures for conveying extrudable material from the feedholes to the discharge slots, and also an array of thickened pin support segments disposed among the apertures for joining the pin root ends to the solid segments between feedholes on the die body. The pin support segments are of larger cross-section than the minimum feedhole inter-spacing, that is, they provide a larger area for pin root connection than is provided by the die body segments between feedholes supporting the pin roots in conventional dies. As a result, significant increases in both pin stiffness and pin attachment strength are realized.

Another aspect of the invention arising from the foregoing improvements is an improved method for making extruded honeycomb structures via the extrusion of plasticized honeycomb batch material through this novel die. As noted above, in the conventional forming method the batch material is discharged from the die through the discharge slots formed between parallel pins on the die discharge face, the batch material thus being forced past the pins under relatively high pressures. In conventional dies the pins are attached to the die body only via the narrowed pin roots at the bases of the pins, but in accordance with this invention the pins are supported against bending or detachment under the force of the extruding batch material by the pin support segments positioned between and supporting the pin roots on the die body.

Still a third aspect of the invention is a method for making a honeycomb extrusion die as described. In accordance with that method a metal plate for the die body is first provided. The die body plate will be machined, initially or at some later point during die fabrication, with an array of parallel feedholes for batch delivery through the plate.

Also provided will be a metal plate providing the layer of material for the pin support section of the die. The plate may be only thick enough for the pin support section itself, i.e. thick enough only to provide stable pin support, but more preferably it will be thick enough to provide material for both the pin support section and the discharge section of the die. In either case an array of apertures will be formed in one face of the plate, and those apertures will be configured to leave an interspersed array of pin support segments among the apertures.

Following the machining of the apertures the pin support section will be attached to the die body with its apertures in registry with the body feedhole locations. Thereafter at a die discharge section connecting with the pin support section will be formed or attached.

The die discharge section will comprise an array of criss-crossing discharge slots disposed between an array of parallel pins, and the pins will having pin roots connecting with the pin support segments rather than directly with the die body. In principle, the discharge section may be provided by cementing an array of pins to the pin support segments of the pin support plate, but more typically it will provided by machining a separate plate, or the exposed surface of the pin support plate, to form the discharge slots and pins thereon.

DESCRIPTION OF THE DRAWINGS

The invention may be further described with reference to the appended drawings, wherein:

FIGS. 1a and 1b schematically illustrate the pin root attachments provided in a conventional extrusion die;

FIGS. 2a and 2b schematically illustrate the pin root attachments provided in a conventional widened-slot extrusion die;

FIGS. 3a and 3b schematically illustrate the pin root attachments provided in a widened slot extrusion die according to the invention; and FIG. 4 is a schematic illustration of a preferred embodiment of an extrusion die in accordance with the invention.

DETAILED DESCRIPTION OF THE INVENTION

In present commercial honeycomb die designs the pin roots of the die are located at the transitions between the feedholes and the discharge slots. These pin roots are not only the sole means for keeping the pins attached to the die, but also the points in the die most susceptible to deformation as bending stresses are applied to the pins in the course of handling In the case of high cell density dies, e.g. dies for honeycombs having cell densities above 150 cells/cm$^2$ and cell walls below 50 um in thickness, this pin root is particularly small and thus pin damage occurs very easily. Especially fragile die constructions are the alternate-intersection-fed dies, i.e., dies having feedholes provided on each alternate slot intersection.

FIGS. 1a–1b of the drawing schematically illustrate the relative sizes and shapes of typical pin root attachments in dies of this type. FIG. 1a is a schematic top plan view in partial cutaway of a section of such a die, while FIG. 1b schematically shows the actual pin root shape of the die of FIG. 1a with reference to two adjacent feedholes.

Referring particularly to FIG. 1a, die portion 10 includes a die body 12 provided with a plurality of parallel feedholes 14, the die body integrally connecting with an array of pins 16 defining the criss-crossing discharge slots 18 in the discharge section of the die. The die discharge face is defined by the slot openings and top surfaces of pins 16 seen in this top plan view. The pin bases and pin roots or points of connection of pins 16 with die body 12 are hidden by the pin top surfaces, but are represented in size and shape by the pin root area 19 in FIG. 1a, shown partially in phantom.

FIG. 1b more clearly shows the shape of the pin roots joining the pins to the die body in this die design. The cross-sectional size and shape of the pin root at its joint or connection with the die body is shown as hatched pin root area 19 in FIG. 1b, this area being the only connection left between the pin and the die body after the feedholes 14 have been drilled in the body. That is, in the course of machining the die, pin portions 16a are removed from the base of square pin 16 to clear the entrances to feedholes 14, leaving only pin root for pin attachment.

Because base portions 16a are preferentially removed from the base of pin 16, pin root 19 is relatively narrow across axis "x" of the root. The length of axis "x" is equal to the minimum feedhole interspacing for the die whereas the length of axis "y" is equal to the length of the diagonal across the top surface of pin 16 in FIG. 1a. As the relative dimensions of axes "x" and "y" suggest, the moment of inertia against bending for pin 16 is significantly less about axis "y" than it is about axis "x". Thus pin 16 is particularly susceptible to bending about axis "y".

The problem of pin damage is even more severe in the case of so-called "wide slot" extrusion dies machined to provide enhanced lateral batch flow in the discharge slot section of the dies. In dies of this design, portions of the base sections of the pins are reduced in cross-section to reduce the resistance of the slots to lateral batch flow along the bases of the slots. This provides a discharge slot design wherein the slots have a first slot width at slot base sections adjoining the pin support section that is larger than a second slot width provided at or adjacent to the die discharge face. FIGS. 2a–2b of the drawings illustrate a die of this design.

FIG. 2a is a schematic top plan view in partial cutaway of a portion of an extrusion die 20, again comprising a die body section 12 provided with feedholes 14 and an array of pins 16 forming discharge slots 18 in the discharge section of the die. In this case, however, the bases of pins 16 have been relieved by channeling so that the pin base sections are of the reduced cross-section indicated by pin base outline 16'.

Because the bases of pins 16 have been reduced in size to that shown by pin base outline 16', the pin root shape indicated by hatched root area 19' in FIG. 2b is reduced. This reduction in root cross-section is simply due to the area reduction arising from the shortening of axis "y" of the root cross-section indicated in FIG. 2b. Thus while the minimum feedhole interspacing shown by axis "x" in FIG. 2b remains same as that shown in FIG. 1b, the moment of inertia against bending about axis "y" in FIG. 2b is lower than that about the same axis in FIG. 1b. This is simply because of the reduction in the amount of pin root connecting material remaining after feedhole drilling.

The present invention enables the construction of extrusion dies of both conventional and wide-slot designs wherein reductions of the pin moments of inertia resulting from feedhole machining are substantially avoided. A useful design for such a die is shown in FIGS. 3a–3b of the drawings, FIG. 3a comprising a schematic top plan view in partial cutaway of a portion of such an extrusion die as viewed toward the die discharge face, and FIG. 3b presenting an enlarged view of the pin root support cross-section for such a die.

Referring more particularly to FIG. 3a, die section 30 includes a die body portion 12 provided with a plurality of feedholes 14 and an array of pins 16. The discharge face of the die formed by the top surfaces of pins 16 incorporates the criss-crossing array of discharge slots 18.

Included in this die for enhanced pin support is pin support layer 40 which is bonded to or integral with the other components of the die. That support layer includes apertures 42 for conveying batch material through the support layer as well as an array of pin support segments 44 disposed about apertures 42 for joining the root ends of pins 16 to die body portion 12. Pin support segments 44 are disposed over the portions of die body 12 between feedholes 14, but are of larger cross-section in the plane of the support layer than the minimum feedhole interspacing connected to situated. The effective support area for the pin roots is defined by pin root area 44' shown in phantom in the die of FIG. 3a. As also shown in FIG. 3(a), each feedhole 14 in die body 12 is in registry with and supplies batch material to only one aperture 42 in support layer 40.

The configuration of the pin root in this die design is more clearly shown in the enlarged view of pin root area 44' in FIG. 3b of the drawing. As shown in FIG. 3b, axis x defining the cross-section of pin root area 44' is significantly longer than the minimum feedhole interspacing between feedholes 14, that interspacing being shown for comparison as spacing "z". Accordingly, the moment of inertia against bending of pin 16 about pin root axis "y" is much larger than is the case for the die designs of FIGS. 1a and 2a.

In the construction of extrusion dies in accordance with the invention the pin support layer may be provided as a separate layer if desired, or it may constitute an integral layer formed together with the die body, the pin array, or both. If the pin support layer is formed as a separate element, the pins must be attached by bonding to the pin support sections of the support layer after the modified die body has been formed. This approach is not favored, however, because it significantly increases the probability of pin detachment from the supports during die handling, or during use at high extrusion pressures.

In a preferred embodiment, therefore, the pins and pin support layer are fabricated as a unitary element of the die, either as part of the die body or, more conveniently, as a composite die discharge section connecting with the die body by a metal-to-metal bond. This approach is particularly well suited to the production of wide-slot extrusion dies, wherein the bases of the pins are reduced in cross-section and therefore bonding of the pins to a support layer would be difficult.

FIG. 4 of the drawing is a perspective elevational view in partial cross-section of an extrusion die constructed in accordance with this preferred embodiment. Referring more particularly to FIG. 4, honeycomb extrusion die section 50 is formed of a die body 52 comprising a plurality of feedholes 54 joined to a composite die discharge section 55 by means of a bonding layer 57.

The composite die discharge section incorporates both an array of pins 56 forming discharge slots 58 and a pin support layer 60 integral with the pins providing improved pin support. The extrusion die of FIG. 4 is of the widened slot type, in this case due to the machining of the base sections 56' of pins 56 to form enlarged slot base segments 58' below the narrower discharge slots 58 opening upwardly onto the discharge face of the die.

In an important aspect the die design of FIG. 4 can be characterized as a shaped feedhole die design, the apertures in the pin support layer being shaped apertures constituting cross-shaped feedhole extensions which are configured to improve pin support. These shaped feedhole segments in combination with the adjoining transition area incorporating the pin roots and pin base sections allow for both improved batch flow characteristics and enhanced die strength.

These shaped aperture or shaped feedhole designs can encompass a wide variety of feedhole geometries that can modify batch flow characteristics to achieve both extrusion pressure reductions and improved batch flow uniformity. At the same time, they provide increased die strength, both in the die body via increased ligament efficiency and in the pins via increases in pin root area and pin bending moment of inertia. While the shaped feedhole concept includes the use of shaped feedholes extending entirely through the die body, more economic use is in conjunction with standard round feedholes that can be conventionally machined, with feedhole shaping being confined to the apertures provided in the shorter pin support section disposed between the die body and the bases of the pins. While cross-shaped apertures providing "rounded square" pin support segments as shown in FIG. 4 are preferred, other shaped aperture designs, including designs providing sharply configured cross-shaped apertures and sharply squared pin support segments, can be used.

The use of a shaped feedhole/transition area in accordance with the invention in fact makes it possible to apply slot widening techniques to high-cell-density dies that would otherwise be unacceptably prone to pin damage if modified using such techniques. For example, wide-slot extrusion dies for the production of honeycombs of 900 cells/in$^2$ cell density or higher, offering the advantages of both reduced die back-pressure and increased lateral batch spreading for more uniform batch flow, can readily be provided using a pin root support section as hereinabove described. On the other hand, when slot widening is done without this added pin support feature, severely reduced pin strength is observed even in dies with cell densities of 600 cells/in$^2$ and below.

The materials used to construct the extrusion dies of the invention may be conventional. Examples of materials suitable for the fabrication of the major die elements include tool steels, so-called high-speed steels, and stainless steels, with the latter steels being generally preferred. Types 450 stainless steel and 422 stainless steel are examples. The bonding together of the various die elements may also be conventional. Soldering, braising, and diffusion bonding techniques known for use in the assembly of the laminated extrusion dies of the prior art are suitable, with the use of diffusion bonding normally being preferred.

The method of manufacturing dies of the configurations herein will depend in part on the designs selected for the slots, pin support sections and die bodies to be assembled. However, for the construction of extrusion dies of the design shown in FIG. 4 of the drawings, composite discharge section fabrication through a combination of electrical discharge machining (EDM) for the shaped feedhole extensions and wire EDM slotting for forming the slot and pin shapes is effective.

Using a presently preferred approach, a metal plate of a thickness adequate for forming a composite pin support and die discharge section is provided on a first surface with recesses for forming the batch flow apertures. A plunge EDM electrode comprising an array of parallel projecting blade elements of rectangular cross-section having the spacing, width and length of first or vertical arms of an array of cross-shaped apertures is used to plunge recesses in the metal surface to a predetermined aperture depth. The electrode or plate is then rotated 90° and the second or horizontal arms of the array of apertures is plunged.

Alternative methods for aperture machining could of course be employed. For example, a plunge EDM electrode incorporating projecting cutting elements having cross shapes conforming to the entire outline of the apertures could be used, or elements of round, square or other shapes could be used to form pilot apertures that could thereafter be shaped to the desired final aperture configurations by subsequent machining steps. Still another approach might involve a micro machining process employing very small cutters to yield the desired aperture patterns.

The aperture plate thus provided can be directly slotted if desired, but more preferably is first attached by permanent bonding to the die body. The die body will typically be pre-drilled with an array of feedholes by means mechanical drilling or electrochemical machining (ECM) processes, although later drilling is a useful alternative. If the feedholes are already present in the die body plate, the recesses in the aperture plate are exactly aligned with those feedholes prior to the bonding step.

Attachment of the aperture plate to the die body is by means of any permanent metal joining process, soldering, brazing or welding being examples. However diffusion bonding through the use of a diffusion bonding layer or plate is preferred. U.S. Pat. No. 3,678,570 to Paulonis et al. describes one suitable diffusion bonding procedure, particularly useful for superalloy and stainless steel bonding, wherein thin alloy interlayers are used to assist the diffusion bonding process through the formation of a transient liquid phase. Using this approach, the connection of the pin support layer to the die body is by means of this bonding interlayer rather than directly, such a bond layer being illustrated as layer 57 in FIG. 4 of the drawings.

Finally, the discharge section of the die is completed by cutting slots in the exposed face of the aperture plate, those slots being cut to a depth sufficient to intersect the aperture recesses formed on the opposing surface of the aperture plate. The step of providing a discharge slot array on the second surface of the aperture plate can be carried out by any of a variety of known techniques, including wire EDM slotting, abrasive wheel slitting, or even conventional blade sawing. The depth of the slots should be controlled to insure that sufficient thickness remains in the pin support layer to withstand the torques that may be applied to that layer, and to the bond between that layer and the die body, under pin bending stresses. For most purposes, a pin support layer thickness of 0.025 inches or higher will be adequate.

Regardless of the method used for forming the initial slots, the fabrication of wide-slot dies comprises an additional step of widening the slot bases to enhance lateral batch flow within the discharge section of the die. This step is most conveniently carried out by wire EDM machining. The use of wire EDM for slot widening will normally be favored in any die design wherein the pin and slot shapes permit straight-line machining, examples of such designs including rectangular-cell and triangular-cell dies as well as square-cell dies. Since these slot widening methods can be used and provide dies wherein the slot widths at the bases of the pins are 2, 3, or even 4 times wider than the slot widths at the discharge ends of the slots, the use of an integral pin support layer in the dies is crucial to securing a satisfactorily durable die construction.

Measurements of maximum pin bending stresses in high-cell-density dies indicate that the stress decreases attainable through the use of a pin support layer in accordance with the invention are substantial. In a conventional 900-cell/in$^2$ extrusion die with no slot widening, the addition of a pin support layer decreases the maximum pin root stress for a given pin deflection in the weakest pin bending direction by a factor of 2. In the case of slot-widened dies of the same cell density but featuring a slot base width 3 times the slot discharge width, the pin support layer decreases the maximum pin root stress for a given pin deflection by a factor of 5. In view of the extremely high costs of producing high-cell-density extrusion dies for the production of advanced extruded ceramic honeycomb products, the substantial positive impact of these stress reductions on the economics of die fabrication and honeycomb production are evident.

Of course it will be apparent to those skilled in the relevant art that the foregoing description and examples of the invention are merely illustrative, and that numerous modifications and adaptations thereof may be resorted in the practice of the invention within the scope of the appended claims.

We claim:

1. A honeycomb extrusion die comprising a die body incorporating an array of parallel feedholes and a discharge section connecting with the die body comprising an array of parallel pins forming criss-crossing discharge slots, the discharge slots communicating with the feedholes and opening onto a die discharge face, the feedholes being separated by a minimum feedhole inter-spacing and the discharge slots being formed by spaces between the parallel pins, the pins connecting to the die by pin root ends and having pin outer ends forming the die discharge face, wherein:

the die includes a pin support section in the form of a planar die region disposed between and connecting with both the die body and the pin root ends, the pin support section comprising an array of apertures for conveying extrudable material from the feedholes to the discharge slots, each feedhole being in registry with and supplying batch material to only one aperture, the pin support section further comprising an array of pin support segments disposed among the apertures for joining the pin root ends to the die body, the pin support segments being of larger cross-section transverse to the feedholes than the minimum feedhole inter-spacing and the die consists essentially of two die elements directly connected by a metal-to-metal bond, the first element consisting of the die body comprising the array of parallel feedholes and the, second element consisting of a composite die discharge section incorporating both the array of parallel pins and the pin support section, the array of parallel pins and the pin support section being a unitary element.

2. A honeycomb extrusion die in accordance with claim 1 wherein the apertures are cross-shaped.

3. A honeycomb extrusion die in accordance with claim 1 wherein the discharge slots have a first slot width at slot base sections adjoining the pin support section that is larger than a second slot width at or adjoining the die discharge face.

4. A method for forming a honeycomb structure by extruding a plasticized honeycomb batch material through a honeycomb extrusion die, the batch material being first conveyed through a die body comprising an array of feedholes and thereafter discharged from the die through a criss-crossing array of discharge slots formed between parallel pins attached by pin roots to the remainder of the die, an improvement wherein:

prior to discharge from the honeycomb extrusion die the honeycomb batch material is caused to traverse a composite die discharge section consisting of a unitary die element incorporating each of the array of discharge slots, the parallel pins, and a pin support section to which the parallel pins are connected by pin root ends, the pin support section comprising (i) an array of apertures for conveying extrudable material from the feedholes to the discharge slots, each feedhole being in registry with and supplying batch material to only one aperture, and (ii) an array of pin support segments disposed among the apertures for joining the pin roots to the die body, the pin support segments being of larger cross-section transverse to the feedholes than a minimum feedhole interspacing.

* * * * *